(12) United States Patent
Haugh

(10) Patent No.: US 8,355,992 B1
(45) Date of Patent: Jan. 15, 2013

(54) SYSTEM AND METHOD FOR VERIFYING THE AGE OF A CONTROLLED SUBSTANCE PURCHASER

(76) Inventor: Michael Haugh, Roseville, CA (US)

( * ) Notice: Subject to any disclaimer, the term of this patent is extended or adjusted under 35 U.S.C. 154(b) by 669 days.

(21) Appl. No.: 12/387,093

(22) Filed: Apr. 27, 2009

Related U.S. Application Data

(60) Provisional application No. 61/128,097, filed on May 16, 2008.

(51) Int. Cl.
G06Q 20/00 (2012.01)
(52) U.S. Cl. .................................. 705/64; 902/3; 902/5
(58) Field of Classification Search .................... 705/64; 902/3, 5
See application file for complete search history.

(56) References Cited

U.S. PATENT DOCUMENTS

| | | | |
|---|---|---|---|
| 7,995,808 B2 * | 8/2011 | Rowe et al. ................... 382/124 |
| 2003/0092489 A1 * | 5/2003 | Veradej ........................... 463/36 |
| 2003/0163710 A1 * | 8/2003 | Ortiz et al. ..................... 713/186 |
| 2003/0177102 A1 | 9/2003 | Robinson |
| 2004/0133477 A1 * | 7/2004 | Morris et al. ................... 705/21 |
| 2004/0158724 A1 * | 8/2004 | Carr et al. ..................... 713/186 |
| 2004/0238629 A1 | 12/2004 | Buchholz |
| 2005/0289058 A1 * | 12/2005 | Hoffman et al. ................. 705/44 |
| 2006/0001524 A1 | 1/2006 | Thorn |
| 2006/0273155 A1 | 12/2006 | Thackston |
| 2007/0152043 A1 * | 7/2007 | Mollett et al. ................. 235/383 |
| 2007/0168290 A1 * | 7/2007 | Robinson ........................ 705/51 |
| 2007/0260491 A1 | 11/2007 | Palmer |
| 2008/0033740 A1 * | 2/2008 | Cahn et al. ........................ 705/1 |
| 2008/0051933 A1 * | 2/2008 | Vrachan et al. ............... 700/231 |
| 2008/0071674 A1 * | 3/2008 | Thackston ....................... 705/38 |
| 2008/0073425 A1 * | 3/2008 | Brock et al. ................... 235/380 |
| 2008/0097851 A1 * | 4/2008 | Bemmel et al. ................. 705/14 |
| 2008/0140250 A1 * | 6/2008 | Dave .............................. 700/237 |
| 2008/0257956 A1 * | 10/2008 | Grannan et al. ............. 235/380 |
| 2008/0285814 A1 * | 11/2008 | Di Carlo et al. ............. 382/115 |
| 2009/0210240 A1 * | 8/2009 | Benschop et al. ................ 705/1 |

* cited by examiner

Primary Examiner — James A Reagan
Assistant Examiner — Calvin Cheung
(74) Attorney, Agent, or Firm — Heisler & Associates

(57) ABSTRACT

A system and method for verifying the age of a controlled substance purchaser are disclosed. The system and method in an example embodiment include receiving biometric data corresponding to a consumer who has presented an age-restricted product for purchase at a point of sale location; generating an age verification request including the biometric data; sending the age verification request to a central computer via a data network; receiving a response message from the central computer via the data network, the response message including information for determining whether the consumer is of sufficient age to purchase the age-restricted product; and denying purchase of the age-restricted product if the consumer is determined to not be of sufficient age to purchase the age-restricted product.

13 Claims, 7 Drawing Sheets

SYSTEM AND METHOD FOR VERIFYING THE AGE OF A CONTROLLED SUBSTANCE PURCHASER

PRIORITY APPLICATION

This is a non-provisional utility patent application that claims priority to a provisional patent application Ser. No. 61/128,097; filed on May 16, 2008; by the same inventor.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008-2009, Michael Haugh, All Rights Reserved.

BACKGROUND

1. Technical Field

This disclosure relates to information exchange using networked systems. More particularly, the present disclosure relates to a system and method for verifying the age of a controlled substance purchaser.

2. Related Art

While most goods can be freely sold to any purchaser having the required funds available to pay the purchase price, some products are identified as "controlled substances" or "age-restricted products" that cannot be freely sold. Some such controlled substances are restricted as to the age of the purchaser. For instance, alcoholic beverages can only be purchased in many states if the purchaser is at least twenty-one years old. In many States, cigarettes and other goods have related age sufficiency requirements for a purchase transaction to lawfully occur.

When individuals who do not meet the required age for making the purchase still desire to purchase such controlled substances, various different illicit techniques have been developed to unlawfully dupe the cashier at a retail store into believing that the purchaser has the requisite age to complete the purchase. One common method for deceiving the cashier is to utilize a false identification (ID) or a valid ID of a person other than the purchaser. The purchaser presents the incorrect ID when prompted by the cashier. Only if the cashier can accurately recognize that the photo on the ID is not the person attempting to purchase the controlled substance, can the cashier prevent the transaction. Often such ID photos are sufficiently small and the variability in human appearance is sufficiently great that a cashier will not notice this discrepancy. Furthermore, as the cashier is generally desirous of avoiding confrontation with purchasers and maximizing the number and amount of transactions concluded, the cashier is not incentivized to prevent the transaction from occurring.

In other cases, an individual will take an accurate and proper identification card and alter the date of birth section (and/or the photo) to indicate an earlier date of birth than actually exists. In such a case, the photo would appear accurate to the cashier, but the small numbers depicting the date of birth would have been altered. Unless the cashier accurately notes that the date of birth numbers are too recent to substantiate the required age, the transaction will be improperly completed.

Other forms of false identification cards can also be generated which can successfully convince the cashier that the purchaser is older than the required age, when the purchaser is in fact not older than the required age. In each case, the purchaser ends up gaining access to the controlled substance in violation of law. Statistics tell a grim tale of the effects of alcohol on underage drivers. The mix of driver inexperience with degraded perception induced by the alcohol, contribute to automobile accidents being one of the significant causes of death or serious injury for young people, and particularly those under the legal drinking age. Related problems for society accompany distribution of controlled substances improperly to those who have not yet attained the required age.

U.S. Patent Publication No. US 2003/0177102 describes a system and method of biometric-based age verification for authorizing presenter access of age-restricted good or services between an age presenter and an age verifier. System Presenters register at least one biometric identifier, at least one identification number, personal age-verifying data, and personal identity-verifying data. A presenter presents a biometric sample obtained from the presenter's person and the presenter's system ID number to conduct age verifications for purchase of or access to age-restricted goods or services. This data is used to authenticate the presenter's age and authorize access to purchase or obtain age-restricted goods or services by matching the presented transaction biometric with at least one registered biometric template and without the use of a man-made identity token.

U.S. Patent Publication No. US 2007/0260491 describes a system for delivery and monitoring the administration of controlled substances which includes one or more databases including a national database of controlled substance users, a database including physician/pharmacy information, a controlled substance delivery device and a docking station for use together with a network and software for communication between the various components of the system.

U.S. Patent Publication No. US 2006/0001524 describes a system for checking the authenticity of a form of identification; a local reader for reading a form of authentication; a transmitter associated with the local reader for transmitting the information to a central location; a system at the central location for verifying the information with an authority which has issued the identification and for transmitting back to the local reader an indication that the form of identification is valid.

U.S. Patent Publication No. US 2004/0238629 describes a system and method of conducting sales transactions. More particularly, the system includes a first station at which a customer may obtain a portable scanning device. This scanning device may be readily transported about a store and may be utilized to both scan and purchase the items selected by the customer. In addition, the invention generally includes a processor assembly that is wirelessly communicable with the portable scanning device. This feature may be characterized as enabling the customer to make a purchase from virtually any location in the store. After the desired items are purchased, an exit audit may be conducted in which an electronic scale assembly that is communicatively interconnected with the processor assembly is utilized to audit the purchase.

U.S. Patent Publication No. US 2006/0273155 describes a system and method providing for an independent provider of electronic "stored value" credit to enable a consumer of products and services to apply cash or cash equivalents to fund an electronic account, i.e., a stored value account (SVA), managed by an independent stored value provider (ISVP) in a network of ISVPs. The consumer is typically a customer of the ISVP. The applied funds may be used by the customer to purchase products and services from any of several merchants that have established a transactional business association with the ISVP. The merchants may also be any type of on-line e-commerce business and/or a traditional in-store business. Moreover, a customer may transfer funds from one SVA to another SVA. Customers may add funds to a SVA, in person, at a Retail Financial Service Provider (RFSP) who verifies the identity of the consumer.

Accordingly, a need exists for a more robust system to ensure that only purchasers who have attained the required legal age can properly purchase controlled substances. Such a system should not penalize the cashier or retail store operator, but rather be a system that is easy for the store to implement. Also, such a system should be minimally intrusive upon the privacy concerns of individuals in our society. Thus, a system and method for verifying the age of a controlled substance purchaser are needed.

BRIEF DESCRIPTION OF THE DRAWINGS

Embodiments illustrated by way of example and not limitation in the figures of the accompanying drawings, in which.

DETAILED DESCRIPTION

A system and method for verifying the age of a controlled substance purchaser are disclosed. In the following description, numerous specific details are set forth. However, it is understood that embodiments may be practiced without these specific details. In other instances, well-known processes, structures and techniques have not been shown in detail in order not to obscure the clarity of this description. Various embodiments are described below in connection with the figures provided herein.

Overview of Various Embodiments

Figure 1:
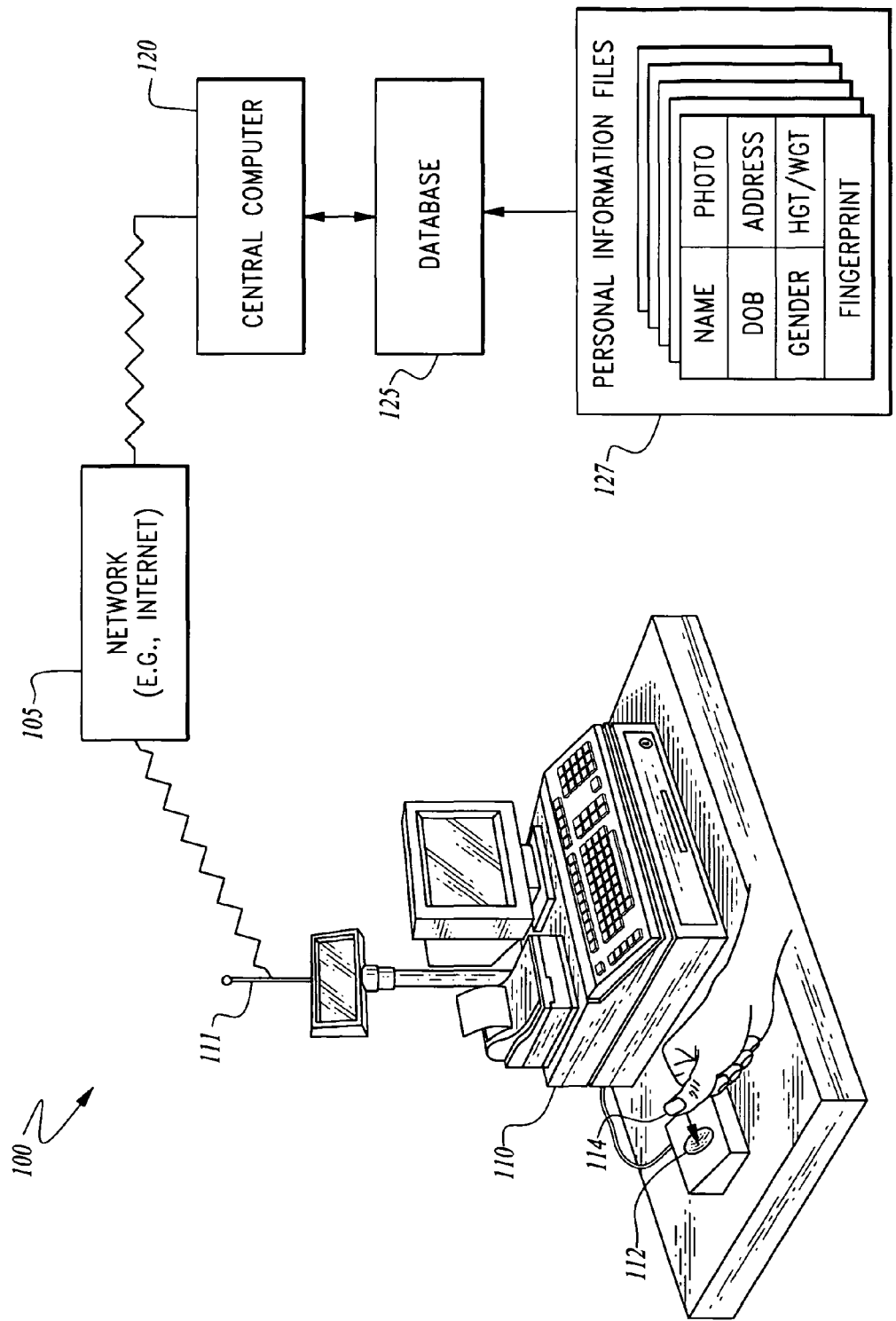
FIG. 1 illustrates an example embodiment of a networked system in which various embodiments may operate.

As described for various embodiments herein, a system is provided for verifying the age of a purchaser of a controlled substance, such as alcoholic beverages, from a retail store. An example embodiment of system 100 is illustrated in FIG. 1. As shown in FIG. 1, typically a cash register or other form of point of sale terminal 110 is provided at the location in the store where the retail transaction takes place (i.e., the point of sale or POS location). Also, a conventional bar code scanner (not shown) is often provided to automatically scan bar codes on purchased goods. Using one of the various embodiments described herein, an additional item is provided at the point of sale location in the form of a conventional biometric data capture device (e.g., fingerprint scanner) 112. The biometric data capture device utilizes conventional machine vision technology to convert at least portions of the fingerprint 114 of the purchaser into a digital file which is capable of being read, transmitted and compared to other fingerprint files in a database 125. A central computer 120 can match the scanned fingerprint file with fingerprint records within associated databases 125 in a manner described in more detail below. The conventional machine vision technology can use charge coupled devices (CCD's) or arrays of optical switches or infrared scanning technology, or any other known technology to generate a unique data file for a scanned fingerprint that can be matched and compared to other scanned fingerprints (or data files representative of other fingerprints).

The point of sale terminal (e.g., cash register) 110, and possibly the biometric data capture device 112, can be coupled (either wirelessly or through a physical connection, such as a telephone line) to a central computer 120 via a data network, such as the Internet 105. If wireless data communication technology is used, the point of sale terminal 110 can include an antenna 111 for wireless data communication to a wireless router or the like. In this manner, the point of sale terminal 110 can establish networked data communications with the central computer 120. The point of sale terminal 110 can also be directly coupled to the biometric data capture device 112 as shown in FIG. 1. In a typical configuration, the point of sale terminal 110 can be configured as a client device and the central computer 120 can be configured as a network server. Conventional client/server data communication protocols can be used. The central computer 120 has access to a database 125 of personal information files 127, which may include fingerprint data or other biometric data for individuals who have established a record with the administrator of the central computer 120. One such administrator of the central computer 120 can be a Department of Motor Vehicles (DMV) computer and database of driver's license holders and DMV Identification (ID) card holders. Other examples of an administrator of the central computer 120 and database 125 can include the Immigration and Naturalization Service (INS), military agencies, other government agencies, corporations or other public or private organizations who may retain and control access to personal biometric data. In a typical implementation, the personal information files 127 include fingerprint data or other biometric data for individuals along with the individual's name, date of birth (DOB), address, gender/sex, height and weight (Hgt/Wgt), photo image, and a variety of other personal information related to a particular individual.

Figure 2:
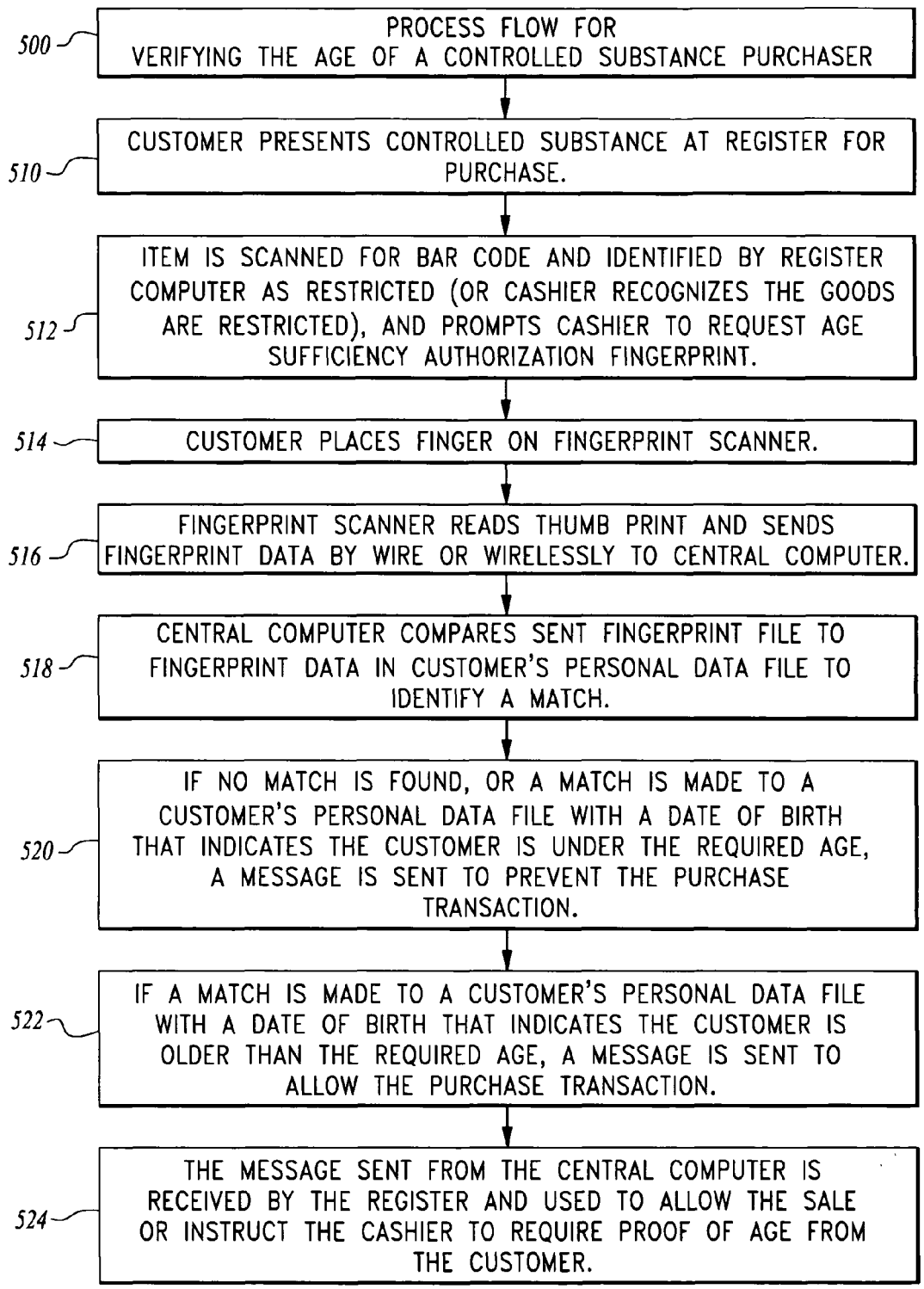
FIG. 2 is a process flow diagram illustrating a sequence of process operations in an example embodiment.

This basic example system 100 shown in FIG. 1 and associated processes of an example embodiment illustrated in FIG. 2 can be utilized in the following fashion. First, when a purchaser presents a controlled substance for purchase at the point of sale location (FIG. 2, process block 510), either the cashier recognizes that the item is controlled, or upon scanning the item with a bar code scanner, the point of sale terminal 110 communicates to the cashier that the item is a controlled substance (FIG. 2, process block 512). The cashier can then prompt the prospective purchaser to place their thumb or some other finger onto the biometric data capture device 112 (FIG. 2, process block 514). The biometric data capture device 112 can then scan the fingerprint 114 and create a corresponding fingerprint digital file (FIG. 2, process block 516). The fingerprint digital file is transferred to the point of sale terminal 110 or generated by the point of sale terminal 110 in concert with the biometric data capture device 112.

This fingerprint digital file, created at the point of sale location, can be augmented with additional information to form an age verification request, which can be sent to the central computer 120 via network 105 (FIG. 2, process block 516). The age verification request can be augmented, for example, to include a required age or product code associated with the age-restricted product presented for purchase by the consumer. The central computer 120 has access to a database 125 of fingerprint data (e.g., a DMV computer in the State where the purchase is taking place). The central computer 120 can compare the fingerprint 114 in the fingerprint digital file that was sent from the biometric data capture device 112 via the point of sale terminal 110 to the fingerprints in the personal information files 127 within database 125 of fingerprint data accessible to the central computer 120 (FIG. 2, process block 518). Software in the central computer 120 can control this comparison and matching procedure, as described in more detail below. If no match is found or the match that is found is for an individual with an age less than the required age, a signal or response message can be sent by the central computer 120 via network 105 back to the point of sale terminal 110 of a retail store to prevent completion of the transaction to the underage customer (FIG. 2, process block 520). This signal or response message can be in the form of data that causes a visual display including a message such as "transaction denied" or "underage." As another alternative, the signal or response message can interact and cooperate with the point of sale terminal 110 to automatically prevent the particular item from being included in the purchase. The cashier can then instruct the purchaser as to their underage status and the purchaser can typically have a second opportunity to provide compelling proof of sufficient age (FIG. 2, process block 524). If the central computer 120 searches database 125 and identifies a personal information file 127 with a fingerprint corresponding with the scanned fingerprint sent from the point of sale terminal 110 of the retail store location, and the age or date of birth information extracted from that personal information file 127 can be used to determine that the age of the purchaser is sufficient to complete the transaction, a signal or response message is communicated to the retail store indicating "transaction approved" or "age sufficient." (FIG. 2, process block 522) The cashier can then complete the transaction (FIG. 2, process block 524).

As a purchaser might be purchasing multiple items, which are of a controlled nature, the system 100 can be configured so that the purchaser would only need to have their fingerprint scanned once and for this information to be remembered for the entire transaction, rather than requiring the purchaser to again provide a fingerprint multiple times during the transaction.

While individual State governments typically maintain separate databases for license holder information, a system in a particular embodiment can operate within each State individually or the databases can be linked to expand this system to operate nationally. This embodiment is described in more detail below in connection with FIG. 4. Furthermore, the system can expand to being an international system should the personal information databases of separate countries be in a form which facilitates such searching of multiple international databases concurrently.

The system of various embodiments does not need to divulge any confidential or private information to the cashier or anyone else. Rather, the system can be configured to only provide to the cashier an indication of whether or not the age of the prospective purchaser is sufficient to complete the transaction. The actual age or date of birth of the prospective purchaser does not have to be disclosed; rather, information merely indicative that the age is either above or not above the required age to complete the transaction is disclosed. By the purchaser presenting their finger for scanning, the purchaser can be considered to imply that their fingerprint should be in the database of individuals having a sufficient age to complete such transactions.

As a prerequisite, this database of fingerprint data 125 must necessarily have been previously created by a fingerprint data repository system having a fingerprint data collection (e.g., the DMV), which is accessible to the central computer 120. Hence, the purchaser already trusted the fingerprint data repository system (e.g., the DMV) with their fingerprint information. Thus, no new information is required to be presented by the prospective purchaser. Rather, the purchaser fingerprint is merely representing data that was submitted previously, for comparison purposes. If desired, the digital file containing fingerprint data sent to the fingerprint data repository system can be encoded in the same manner that credit card numbers and other sensitive information is encoded in a secure remote transaction.

Software already exists by which outlying DMV offices utilize a fingerprint scanner 112 at the outlying offices to verify that the individual present is the same individual for whom an individual record exists in the DMV's central computer 120. For example, the California Department of Motor Vehicles uses such a fingerprint scanner 112 at its various local offices. Software in the point of sale terminal 110 for capturing the purchaser fingerprint at the biometric data capture device 112, creating a corresponding fingerprint data file in an age verification request, and sending the age verification request to the central computer 120 is described in more detail below.

To implement a particular embodiment, database searching and matching software of the central computer 120 can be generated or modified to perform the fingerprint search and compare function. This matching software in central computer 120 is described in more detail below. Such central computer 120 software can be generated or modified to, in a first step, match the sent fingerprint data file with the personal information files 127 in the database 125 to identify the matching personal information file, if any. Second, the date of birth field in the matched personal information file 127 can be extracted and compared to the present date to determine an age of the purchaser. Next, the age calculated by the central computer 120 software can be compared to an age required for the purchase of an item presented for purchase by the consumer at the point of sale location. The required age can be stored in a data file with the central computer 120 (e.g., DMV computer) for the central computer 120 software of a particular embodiment to access or the required age can be transmitted by the point of sale terminal 110 along with the fingerprint data file sent from the retail store site. In another alternative embodiment, the age calculated by the central computer 120 software can be sent to the point of sale terminal 110 and the point of sale terminal 110 can compare the age calculated by the central computer 120 software to an age required for the purchase of an item presented for purchase by the consumer at the point of sale location. If the age calculated by the central computer 120 software is less than the required age, the "underage" condition exists and an indication of this condition is sent back to the point of sale terminal 110 at the retail store location. If the age calculated by the central computer 120 software is greater than or equal to the required age, a 'sufficient age' signal is sent to the point of sale terminal 110 at the retail store location approving the transaction.

Typically, the cashier at the point of sale location can also have a code which can be entered into the point of sale terminal 110 to bypass this age verification security should it be necessary. For instance, an international traveler might only have a passport or a driver's license from some other country that does not have electronic records including fingerprint information linked to the retail store. In such cases, the cashier can demand photo ID, such as a passport, and verify that the age is appropriate in a non-automated manner. In an alternative embodiment, the system of a particular embodiment can require entry of a passport number or other jurisdiction ID card number to at least verify that a genuine number is being presented. However, for a vast majority of purchases, a driver's license is held by the purchaser and the database associated with the driver's license includes the date of birth or other age-determining information. Hence, for nearly all purchasers, the result of the fingerprint scan can be dispositive on the ultimate issue of whether or not the purchase can take place.

Details of example embodiments are provided below. Figures are also provided to depict the example embodiments and to further depict the general arrangement of equipment at the point of sale location and the general configuration of the central computer and personal information file database at a separate location.

Description of the Age Verification Processor of an Example Embodiment

Figure 3:
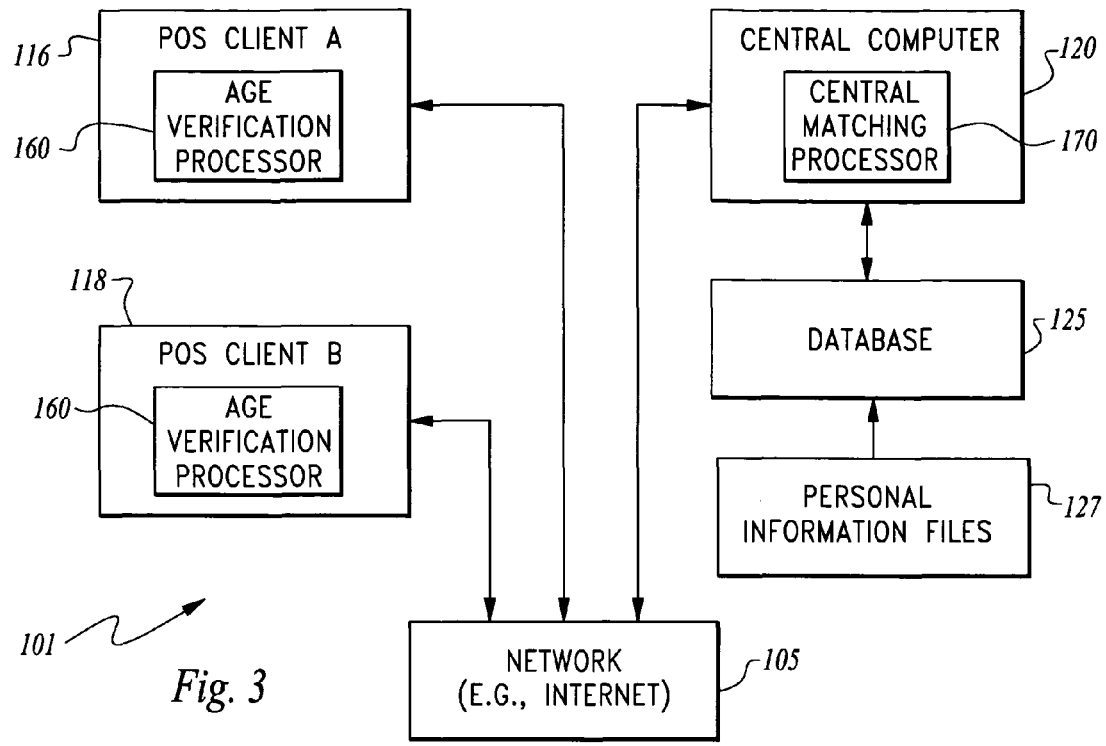
FIGS. 3-4 illustrate example embodiments of networked systems in which various embodiments may operate.

Referring now to FIG. 3, as described in various embodiments described herein, central computer 120 can be considered a network-accessible server, server farm, web site, or the like that can enable network access to and from POS (point of sale) client systems 116 and 118 via a network 105 (e.g. the Internet). FIG. 3 illustrates an example embodiment 101 of a networked system in which various embodiments may operate. As shown in FIG. 3, a central computer 120 is in data communication with one or more POS client systems 116 and 118 via a conventional network 105, such as the Internet. POS client systems 116 and 118 can be used by cashiers or merchants at point of sale locations who can log in to the central computer 120 via browsers and the network 105 and activate the Age Verification service enabled by the various embodiments described herein. In a particular embodiment shown in FIG. 3, an Age Verification processor 160 can be provided in or by each of the POS client systems 116 and 118. The Age Verification processor 160 is described in more detail below in connection with FIG. 5. A Central Matching processor 170 can also be provided in or by central computer 120. The Central Matching processor 170 is described in more detail below in connection with FIG. 6.

It will be apparent to those of ordinary skill in the art that an equivalent configuration could include multiple central computer sites, each managing a portion of the functionality provided by the Central Matching processor 170 described herein. A particular embodiment can include an additional layer, called the Partner Sites, wherein each Partner Site is hosted on a separate server and each Partner Site communicates with the Central Matching processor 170, described in more detail below. In this embodiment, each Partner Site can collect portions of the personal information files for particular purchasers.

Figure 4:
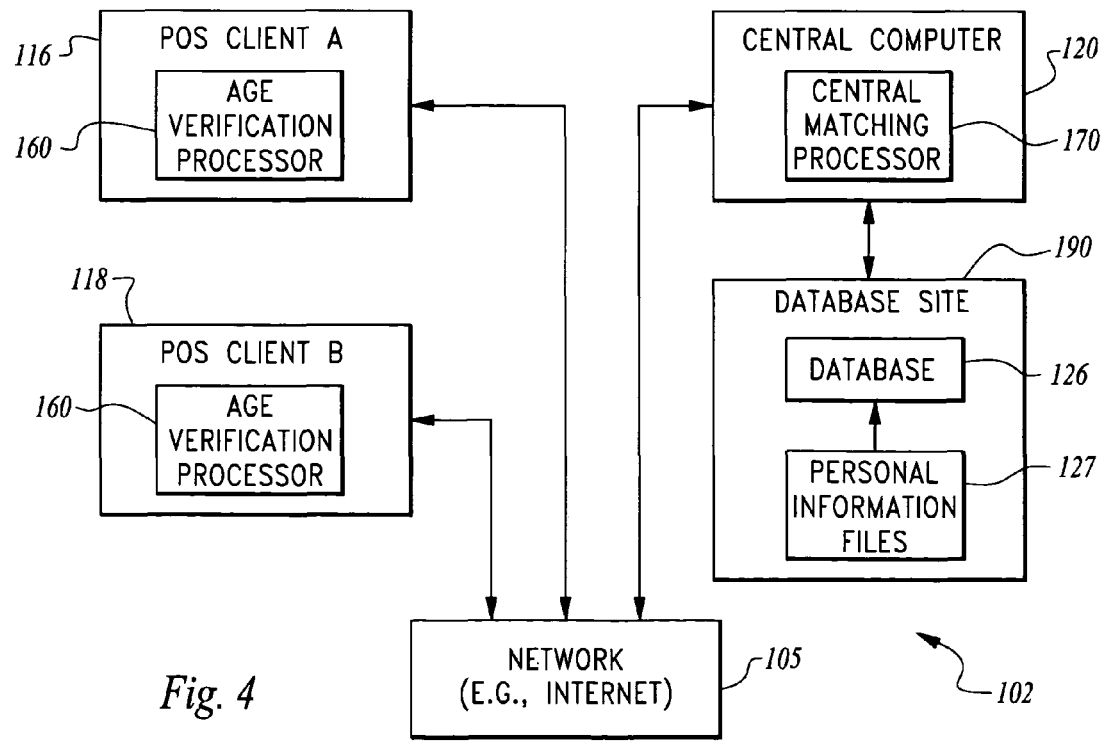

Another alternative embodiment is illustrated in FIG. 4. In alternative system 102 shown in FIG. 4, database 126, which contains the personal information files 127, is located separately from central computer 120 at a database site 190. Database site 190 can be coupled to network 105 and accessed by central computer 120 via network 105. FIG. 4 represents a more distributed arrangement of the database 126 of personal information files 127. In the system embodiment 101 shown in FIG. 3, the database 125 of personal information files 127 is directly connected to central computer 120 and isolated from network 105. Such a configuration may provide a higher level of security for the information stored in the database 125. In contrast, the system embodiment 102 shown in FIG. 4 provides a configuration in which the central computer 120 may access a plurality of distributed databases 126 of personal information files 127 maintained at a plurality of network accessible database sites 190. In this manner, the central matching processor 170 can access personal information files 127 stored in a plurality of network accessible databases 126 located in different States, different countries, or different governmental or private agencies located domestically or internationally.

Further, it will be apparent to those of ordinary skill in the art that another equivalent configuration can include a portion of the functionality provided by the Central Matching processor 170 being downloaded to POS client systems 116 and 118 and executed locally at the point of sale locations. In any of these alternative configurations, the Age Verification service described herein enables and supports an automated system for capturing purchaser biometric information and performing age verification prior to the purchase of an age-restricted product at a point of sale location.

Figure 5:
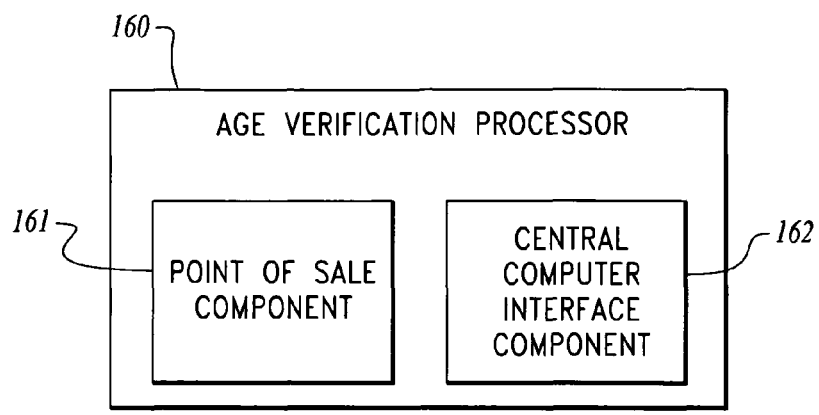
FIG. 5 illustrates an example embodiment showing the functionality components of the Age Verification processor.

Referring now to FIG. 5, an example embodiment showing the functionality components of the Age Verification processor 160 of a POS client system is shown. As illustrated in FIGS. 3 and 4, a central computer 120 is in networked data communication with one or more POS client systems 116 and 118 via a conventional network 105, such as the Internet. Additionally, the Age Verification processor 160, as executed in POS client systems 116 and 118, can gather biometric information for cashiers or merchants from a plurality of consumers who present age-restricted products for purchase at a point of sale location. The functionality provided by the Age Verification processor 160 of a particular embodiment to support the cashiers or merchants can be partitioned into a set of functional components 161 and 162. It will be understood that these functional components can be implemented in software executing in POS client systems 116 and 118. As described above, other equivalent configurations can also be implemented.

Referring still to FIG. 5 in a first functional component, a point of sale component 161 is provided as part of Age Verification processor 160. The point of sale component 161 provides the functionality with which biometric information can be gathered from consumers who present age-restricted products for purchase at a point of sale location. The point of sale component 161 includes a user interface with which the cashier or merchant at a point of sale location can configure the Age Verification processor 160 for use at a particular location. The user interface can also be used to configure the POS client 116 to automatically prevent an underage product transaction or merely display a transaction approval or transaction denial message to the cashier. The user interface can be further used to configure an override code with which a cashier may override an automatically prevented product transaction. As described above, a cashier may be prompted to request identification from a purchaser if a fingerprint-based age verification process results in denial of the purchase transaction. The user interface of the point of sale component 161 can also receive a response message from the central computer 120 via the central computer interface component 162 that indicates whether a particular age verification process results in approval or denial of the purchase transaction. Upon receiving such a response message, the point of sale component 161 can notify the cashier and/or automatically prevent the transaction as pre-configured in the manner described above. A series of transactions by the same purchaser can, also be grouped so the fingerprint verification is only performed once for a particular purchaser.

The point of sale component 161 also includes an interface to the biometric data capture device 112. Biometric data capture devices (e.g., fingerprint scanners) 112 are well known in the art. Conventional biometric data capture device 112 can capture a fingerprint image and either send the full image to point of sale component 161 or reduce the fingerprint image to a set of fingerprint minutiae data representations that can be sent to the point of sale component 161. Once the fingerprint image or minutiae data representations are received by the point of sale component 161, an age verification request including a fingerprint data file can be created by the point of sale component 161. The age verification request can include the fingerprint image or minutiae data representations provided by the scan of the consumer's digit, a required age or product type presented for purchase, a date/time stamp, a location or merchant identifier, and other information of use to the central computer 120. The age verification request can be passed to the central computer interface component 162 for transfer via network 105 to the central computer 120.

Referring still to FIG. 5 in a second functional component, a'central computer interface component 162 is provided as part of Age Verification processor 160. The central computer interface component 162 provides the functionality with which the age verification request can be sent to the central computer 120 for matching of fingerprint data in databases 125 or 127. The central computer interface component 162 can also be configured to receive a response message from the central computer 120 when the matching process has been completed. This response message can be as simple as an approve or deny indication that either, 1) indicates approval of the purchase transaction if the purchaser was matched with a personal information file 127 indicating the required age is satisfied, or 2) indicates denial of the purchase transaction if the purchaser was either unmatched or matched with a personal information file 127 indicating the consumer is underage. In an alternative embodiment, the central computer interface component 162 can receive an indication of the age or birthdate of the consumer from the central computer 120 and the central computer interface component 162 can use the age or birthdate information provided by the central computer 120 to generate the approve or deny indication described above.

Figure 6:
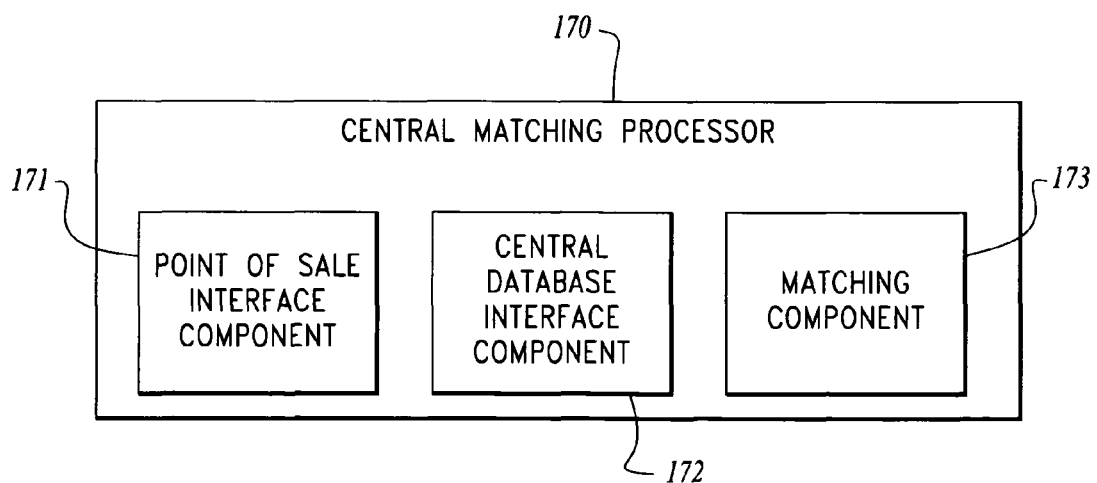
FIG. 6 illustrates an example embodiment showing the functionality components of the Central Matching processor.

Referring now to FIG. 6, an example embodiment showing the functionality components of the Central Matching processor 170 of a central computer system 120 is shown. As illustrated in FIGS. 3 and 4, the central computer 120 is in networked data communication with one or more POS client systems 116 and 118 via a conventional network 105, such as the Internet. Additionally, the Age Verification processor 160, as executed in POS client systems 116 and 118, can send age verification requests including biometric information data files to the central computer 120 as described above. The functionality provided by the Central Matching processor 170 of a particular embodiment to support the cashiers or merchants at point of sale locations can be partitioned into a set of functional components 171-173. It will be understood that these functional components can be implemented in software executing in central computer 120. As described above, other equivalent configurations can also be implemented.

Referring still to FIG. 6 in a first functional component, a point of sale interface component 171 is provided as part of Central Matching processor 170. The point of sale interface component 171 provides the functionality with which the age verification requests including biometric information data can be received from POS client systems 116 and 118 via network 105. The point of sale interface component 171 can include a dispatching function that receives an age verification request from a POS client and initiates a fingerprint matching operation by signaling the central database interface component 172 and matching component 173 that a new request for age verification has been received. The point of sale interface component 171 can also receive results data in a response message from the matching component 173 when the fingerprint matching operation has been completed. The point of sale interface component 171 can then forward the response message to the appropriate POS client system, which originated the corresponding age verification request. The point of sale interface component 171 can also include a user interface with which an administrator at the central computer 120 location can configure the central matching processor 170 for use by particular POS client systems and for use with a particular configuration of database(s) 125 and/or 127.

Referring still to FIG. 6 in a second functional component, a central database interface component 172 is provided as part of Central Matching processor 170. The central database interface component 172 provides the functionality with which the personal information files 127 can be accessed by the central computer 120 for matching of fingerprint data in databases 125 and/or 127. As described above, the central computer 120 can be configured to access personal information files 127 locally in database 125 or remotely in databases 126 at database sites 190. The central database interface component 172 provides the functionality to access the configured database using the appropriate pre-configured access protocol and network routing.

Referring still to FIG. 6 in a third functional component, a matching component 173 is provided as part of Central Matching processor 170. The matching component 173 provides the functionality with which biometric information from a particular purchaser at a POS client location can be compared with biometric data in the personal information files 127 in databases 125 and/or 127. As described above, an age verification request, including purchaser biometric information, can be sent to the matching component 173 from the age verification processor 160 via network 105 and point of sale interface component 171. The matching component 173 can extract the purchaser biometric information (e.g., fingerprint data) from the age verification request received from a POS client system. The matching component 173 can also use the central database interface component 172 to open a pre-configured database of personal information files 127. The matching component 173 can then begin comparing the purchaser biometric information with the biometric information in each of the personal information files 127 in database(s) 125 and/or 127. In order to save time and system resources, this comparison operation may be configured to limit a search to a particular subset of available personal information files 127 based on, for example, a number of configurable parameters, such as the location of the POS client system, the regions associated with a particular product presented for purchase, and the like. The matching component 173 can flag an indication if a matching one of the personal information files 127 is not found. If a matching one of the personal information files 127 is found based on a match between the purchaser biometric information and the biometric information in a matched one of the personal information files 127, the age or date of birth information from the matched one of the personal information files 127 can be extracted. The extracted date of birth information can be used with the current date to compute a current age of the purchaser. The current age of the purchaser can be compared with a required age received in the age verification request from a POS client system. The result of this comparison can either be that, 1) the current age of the purchaser is less than the required age (i.e. underage condition), or 2) the current age of the purchaser is greater than or equal to the required age (i.e. compliant or sufficient age condition). In either case, the matching component 173 can generate a response message or signal indicating the result of the age comparison. This response message or signal can be conveyed back to the POS client that originated the age verification request via the point of sale interface component 171 and network 105. In an alternative embodiment, the matching component 173 can generate a response message or signal simply indicating the current age or date of birth of the purchaser as extracted from the corresponding personal information file 127. This response message or signal can also be conveyed back to the POS client that originated the age verification request via the point of sale interface component 171 and network 105. In this case, the POS client can perform a comparison between the current age or date of birth of the purchaser and the required age for the proposed consumer transaction.

Figure 7:
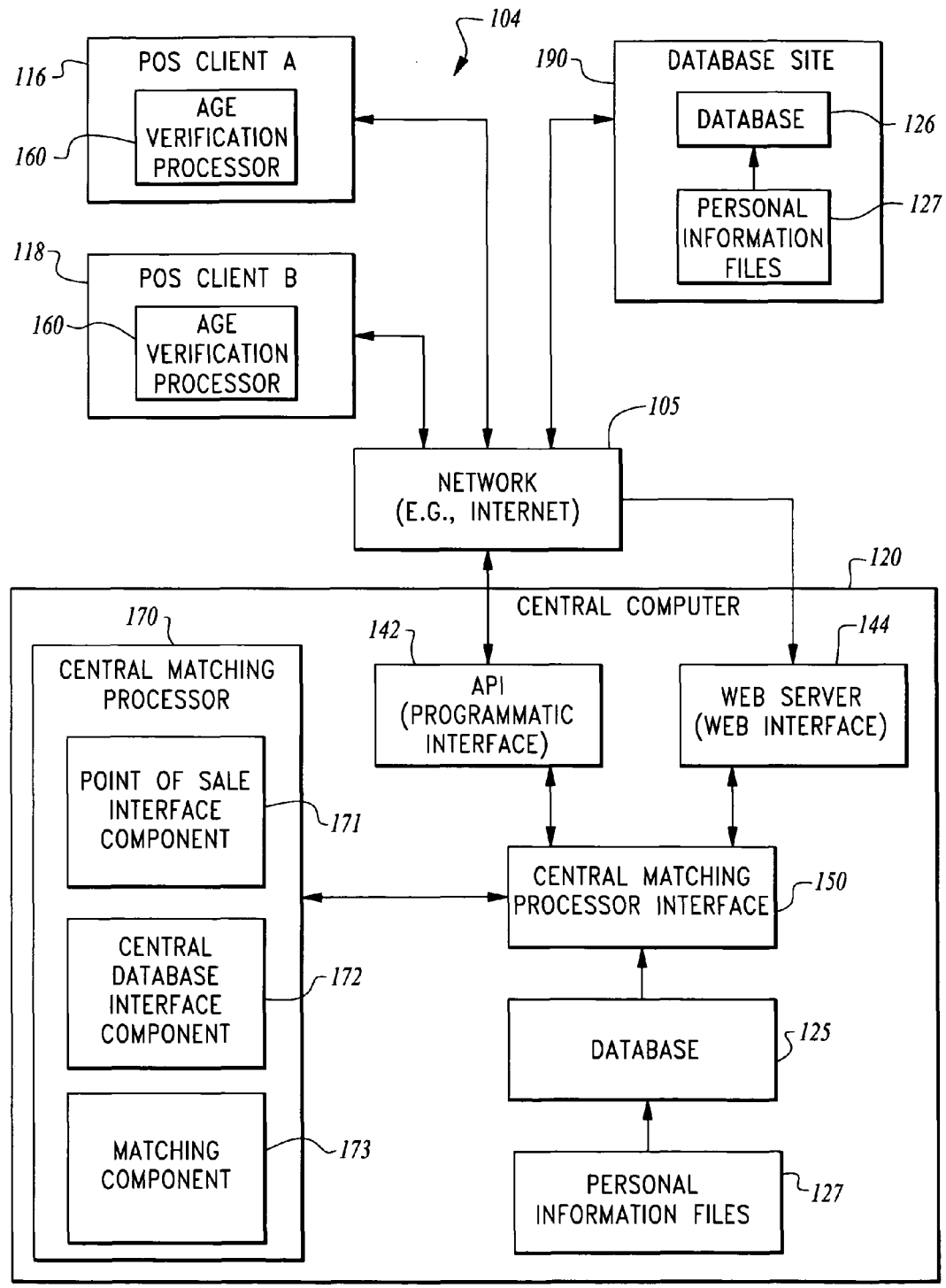
FIG. 7 illustrates another example embodiment of a networked system in which various embodiments may operate.

Referring now to FIG. 7, another example embodiment 104 of a networked system in which various embodiments may operate is illustrated. In the embodiment illustrated, the central computer 120 is shown to include the Central Matching processor 170 as described above. The Central Matching processor 170 is shown to include the functional components 171-173. In a particular embodiment, the central computer 120 may also include a web server 144, having a web interface with which merchants and/or system administrators may interact with the central computer 120 via a user interface or web interface and network 105. The central computer 120 may also include an application programming interface (API) 142 with which the central computer 120 may interact with other network entities (e.g., database sites 190, or POS clients 116/118) on a programmatic or automated data transfer level. The API 142 and web interface 144 may be configured to interact with the Central Matching processor 170 either directly or via an interface 150. The Central Matching processor 170 may be configured to directly access the personal information files 127 in database 125 via interface 150 or to remotely access the personal information files 127 in database 126 at database site 190 via interfaces 142 or 144 and network 105.

Figure 8:
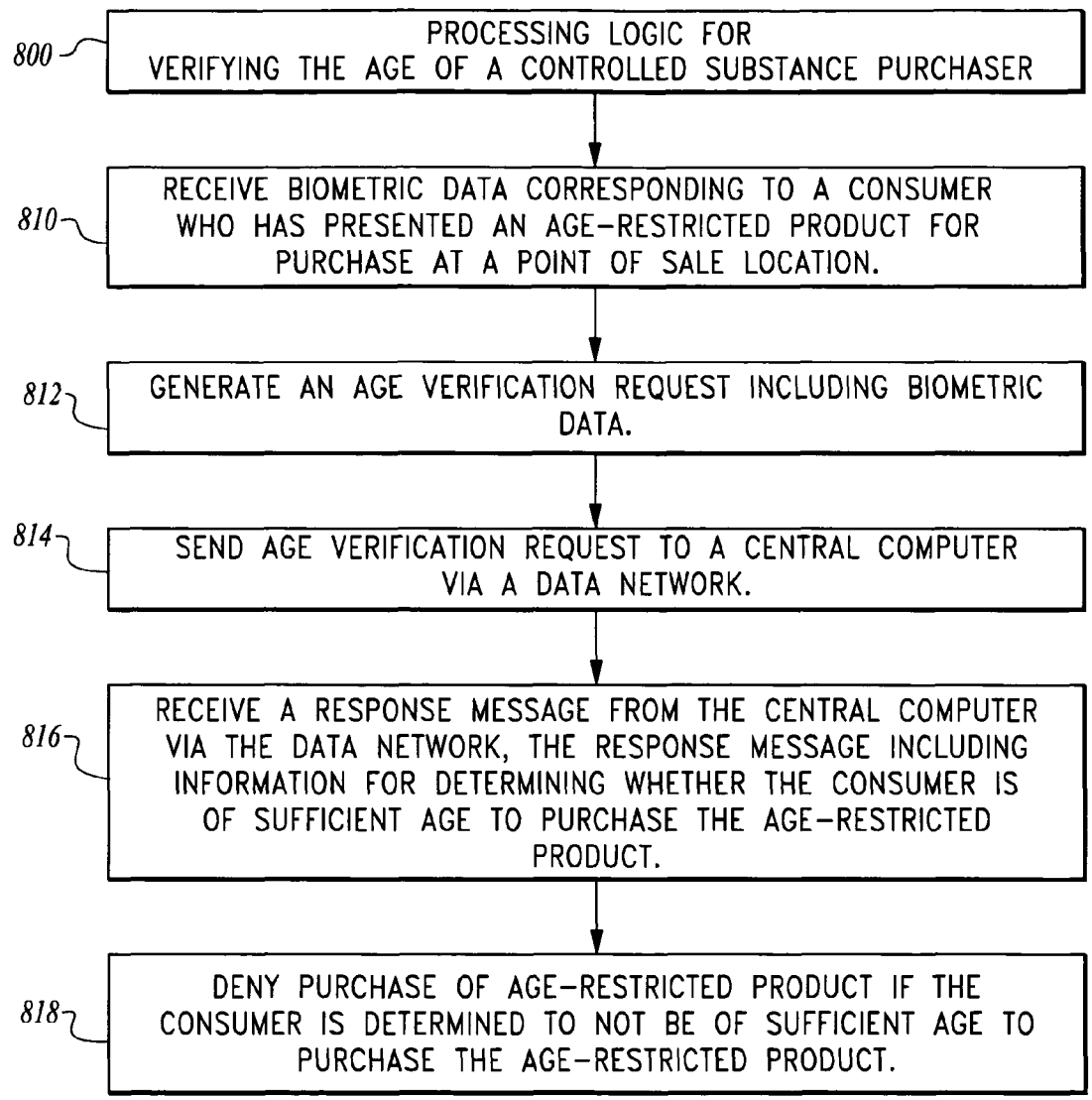
FIG. 8 is a processing flow diagram illustrating a sequence of processing operations in an example embodiment.

FIG. 8 is a processing flow diagram illustrating a sequence of processing operations 800 in an example embodiment. As shown in FIG. 8, processing operations performed by an example embodiment 800 include: receiving biometric data corresponding to a consumer who has presented an age-restricted product for purchase at a point of sale location (processing block 810); generating an age verification request including the biometric data (processing block 812); sending the age verification request to a central computer via a data network (processing block 814); receiving a response message from the central computer via the data network, the response message including information for determining whether the consumer is of sufficient age to purchase the age-restricted product (processing block 816); and denying purchase of the age-restricted product if the consumer is determined to not be of sufficient age to purchase the age-restricted product (processing block 818).

Figure 9:
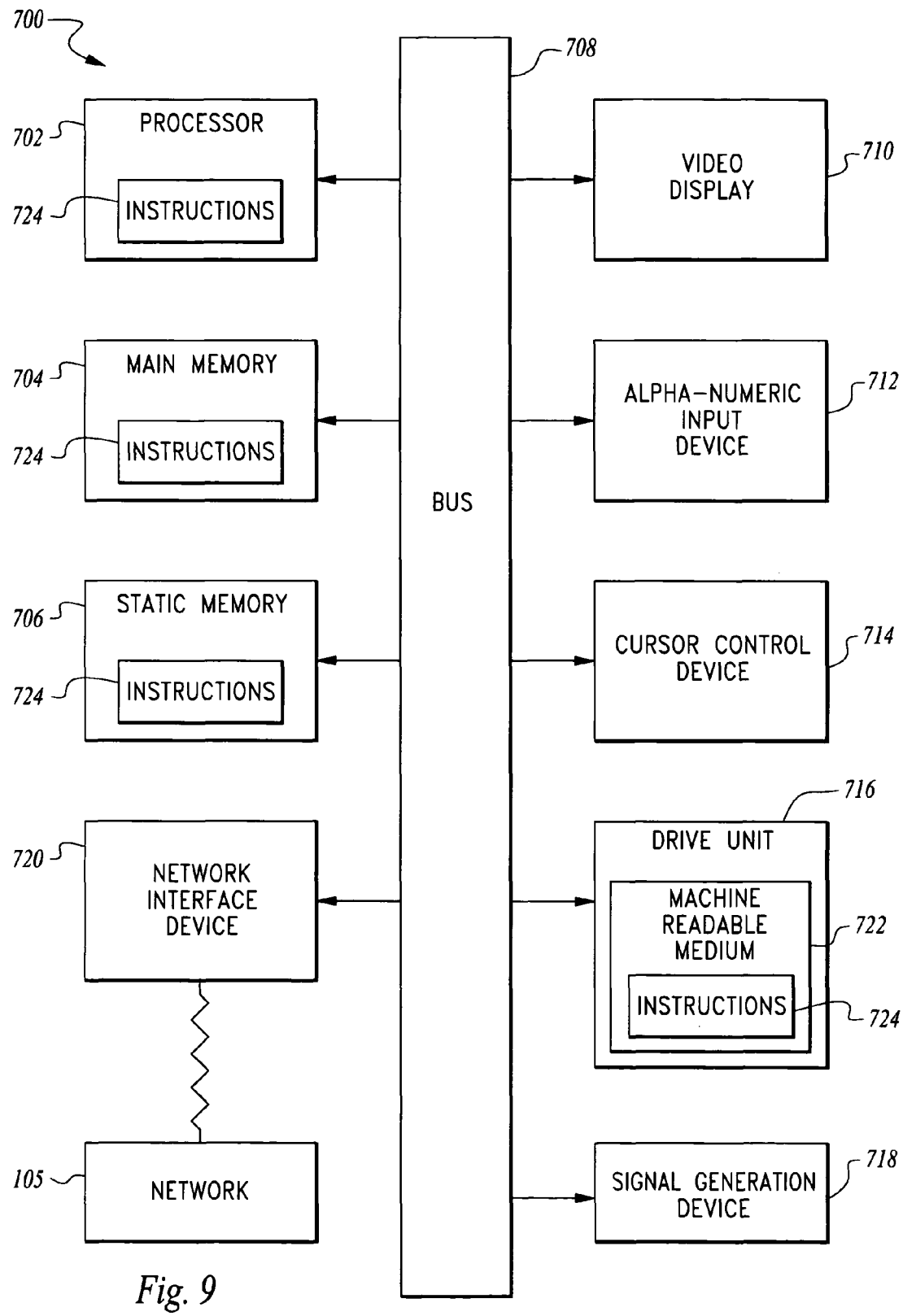
FIG. 9 shows a diagrammatic representation of a machine in the form of a computer system within which a set of instructions, for causing the machine to perform any one or more of the methodologies discussed herein, may be executed, according to an example embodiment.

FIG. 9 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a network/web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 105 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" or "machine-useable medium" should be taken to include a single medium or multiple media (e.g., a central or distributed database, and/or associated caches and servers) that store the one or more sets of instructions. The term "machine-readable medium" or "machine-useable medium" shall also be taken to include any medium that is capable of storing, encoding or carrying a set of instructions for execution by the machine and that cause the machine to perform any one or more of the methodologies of the present description. The term "machine-readable medium" or "machine-useable medium" shall accordingly be taken to include, but not be limited to, solid-state memories, and optical and magnetic media. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

The system of an example embodiment may include software, information processing hardware, and various processing steps, which are described herein. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hardwired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a system and method for verifying the age of a controlled substance purchaser are disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method comprising:
receiving biometric data corresponding to a consumer who has presented an age-restricted product for purchase at a point of sale location;
generating, by use of a data processor, an age verification request including the biometric data corresponding to the consumer, the age verification request not including a consumer identifier other than the biometric data;
augmenting the age verification request with additional information, the additional information including a product code associated with the age-restricted product presented for purchase by the consumer, the additional information including a point of sale location identifier or a merchant identifier;
sending the age verification request with the additional information in real time to a remotely-located central computer via a data network, the central computer being in data communication with a plurality of distributed databases via the data network, at least one of the distributed databases being a government database from the group: a Department of Motor Vehicles (DMV) database, an Immigration and Naturalization Service (INS) database, a military agency database, and a State government agency database;
receiving a response message in real time from the remotely-located central computer via the data network, the response message including information indicative of the age of the consumer, which is used locally at the point of sale location for determining whether the consumer is of sufficient age to purchase the age-restricted product, the response message including information indicative of whether the consumer is of sufficient age to purchase the age-restricted product;

denying purchase of the age-restricted product if the consumer is determined to not be of sufficient age to purchase the age-restricted product; and enabling an agent at the point of sale location to bypass automatic age verification if purchase of the age-restricted product is denied based on the response message, the enabling including receiving and verifying an override code entered by the agent at the point of sale location.

2. The computer-implemented method as claimed in claim 1 wherein the biometric data is a fingerprint.

3. The computer-implemented method as claimed in claim 1 wherein denying purchase includes displaying a message to a cashier indicating whether the consumer is of sufficient age to purchase the age-restricted product.

4. The computer-implemented method as claimed in claim 1 wherein denying purchase includes automatically preventing purchase of the age-restricted product.

5. A system comprising:
a data processor at a point of sale location;
a biometric data capture device coupled to the data processor;
a data network interface coupled to the data processor; and
an age verification processor at the point of sale location for execution by the data processor, the age verification processor configured to:
receive biometric data via the biometric data capture device, the biometric data corresponding to a consumer who has presented an age-restricted product for purchase at the point of sale location;
generate an age verification request including the biometric data corresponding to the consumer, the age verification request not including a consumer identifier other than the biometric data;
augment the age verification request with additional information the additional information including a product code associated with the age-restricted product presented for purchase by the consumer, the additional information including a point of sale location identifier or a merchant identifier;
send the age verification request with the additional information in real time to a remotely-located central computer via a data network, the central computer being in data communication with a plurality of distributed databases via the data network, at least one of the distributed databases being a government database from the group: a Department of Motor Vehicles DMV database an Immigration and Naturalization Service (INS) database, a military agency database, and a State government agency database;
receive a response message in real time from the remotely-located central computer via the data network, the response message including information indicative of the age of the consumer, which is used locally at the point of sale location for determining whether the consumer is of sufficient age to purchase the age-restricted product, the response message including information indicative of whether the consumer is of sufficient age to purchase the age-restricted product;
deny purchase of the age-restricted product if the consumer is determined to not be of sufficient age to purchase the age-restricted product; and
enable an agent at the point of sale location to bypass automatic age verification if purchase of the age-restricted product is denied based on the response message, the enabling including receiving and verifying an override code entered by the agent at the point of sale location.

6. The system as claimed in claim 5 wherein the biometric data is a fingerprint.

7. The system as claimed in claim 5 wherein the age verification processor being further configured to display a message to a cashier indicating whether the consumer is of sufficient age to purchase the age-restricted product.

8. The system as claimed in claim 5 wherein the age verification processor being further configured to automatically prevent purchase of the age-restricted product.

9. An article of manufacture comprising a non-transitory machine-useable storage medium having machine executable instructions embedded thereon, which when executed by a machine, cause the machine to:
receive biometric data corresponding to a consumer who has presented an age-restricted product for purchase at a point of sale location;
generate an age verification request including the biometric data corresponding to the consumer, the age verification request not including a consumer identifier other than the biometric data;
augment the age verification request with additional information, the additional information including a product code associated with the age-restricted product presented for purchase by the consumer, the additional information including a point of sale location identifier or a merchant identifier;
send the age verification request with the additional information in real time to a remotely-located central computer via a data network, the central computer being in data communication with a plurality of distributed databases via the data network, at least one of the distributed databases being a government database from the group: a Department of Motor Vehicles (DMV) database, an Immigration and Naturalization Service (INS) database, a military agency database, and a State government agency database;
receive a response message in real time from the remotely-located central computer via the data network, the response message including information indicative of the age of the consumer, which is used locally at the point of sale location for determining whether the consumer is of sufficient age to purchase the age-restricted product, the response message including information indicative of whether the consumer is of sufficient age to purchase the age-restricted product;
deny purchase of the age-restricted product if the consumer is determined to not be of sufficient age to purchase the age-restricted product; and
enable an agent at the point of sale location to bypass automatic age verification if purchase of the age-restricted product is denied based on the response message, the enabling including receiving and verifying an override code entered by the agent at the point of sale location.

10. A computer-implemented method comprising:
receiving an age verification request including biometric data in real time from a remotely-located point of sale location via a data network, the biometric data corresponding to a consumer who has presented an age-restricted product for purchase at the point of sale location, the age verification request not including a consumer identifier other than the biometric data, the age verification request including additional information, the additional information including a product code associated with the age-restricted product presented for purchase by the consumer, the additional information including a point of sale location identifier or a merchant identifier;

matching, by use of a data processor, the received biometric data corresponding to the consumer with biometric data from personal information files stored in a plurality of distributed databases, at least one of the distributed databases being a government database from the group: a Department of Motor Vehicles DMV database an Immigration and Naturalization Service (INS) database, a military agency database, and a State government agency database;

extracting information from a matched personal information file, the extracted information including information indicative of the age of the consumer;

generating a response message including the information indicative of the age of the consumer and information indicative of whether the consumer is of sufficient age to purchase the age-restricted product, the information being used at the remotely-located point of sale location for determining whether the consumer is of sufficient age to purchase the age-restricted product; and sending the response message in real time to the remotely-located point of sale location via the data network.

11. The computer-implemented method as claimed in claim 10 wherein the biometric data is a fingerprint.

12. The computer-implemented method as claimed in claim 10 wherein the age verification request includes a required age associated with the age-restricted product, the method further including computing a current age of the consumer from the extracted information and comparing the current age of the consumer with the required age.

13. The computer-implemented method as claimed in claim 10 wherein the response message includes an indication that the consumer is determined to not be of sufficient age to purchase the age-restricted product.

* * * * *